US011402207B2

(12) United States Patent
Ohtomo et al.

(10) Patent No.: US 11,402,207 B2
(45) Date of Patent: Aug. 2, 2022

(54) SURVEYING INSTRUMENT

(71) Applicant: TOPCON Corporation, Tokyo-to (JP)

(72) Inventors: Fumio Ohtomo, Saitama (JP); Tetsuji Anai, Tokyo-to (JP); Kaoru Kumagai, Tokyo-to (JP)

(73) Assignee: TOPCON Corporation, Tokyo-to (JP)

(*) Notice: Subject to any disclaimer, the term of this patent is extended or adjusted under 35 U.S.C. 154(b) by 817 days.

(21) Appl. No.: 16/216,218

(22) Filed: Dec. 11, 2018

(65) Prior Publication Data

US 2019/0186912 A1 Jun. 20, 2019

(30) Foreign Application Priority Data

Dec. 19, 2017 (JP) .............................. JP2017-242818

(51) Int. Cl.
*G01C 15/00* (2006.01)
*G01C 5/00* (2006.01)

(52) U.S. Cl.
CPC .............. *G01C 15/006* (2013.01); *G01C 5/00* (2013.01); *G01C 15/002* (2013.01); *G01C 15/008* (2013.01)

(58) Field of Classification Search
None
See application file for complete search history.

(56) References Cited

U.S. PATENT DOCUMENTS

| 6,384,902 B1* | 5/2002 | Schneider | G01C 15/002 33/284 |
|---|---|---|---|
| 2010/0303300 A1* | 12/2010 | Svanholm | G01C 15/00 382/106 |
| 2012/0166137 A1* | 6/2012 | Grasser | G01C 15/002 702/150 |
| 2015/0057028 A1* | 2/2015 | Rudow | G01C 21/20 455/456.3 |
| 2015/0276402 A1 | 10/2015 | Grässer et al. | |
| 2016/0238385 A1 | 8/2016 | Ohtomo et al. | |
| 2016/0238708 A1 | 8/2016 | Ohtomo et al. | |

(Continued)

FOREIGN PATENT DOCUMENTS

| JP | 2016-151422 A | 8/2016 |
|---|---|---|
| JP | 2016-151423 A | 8/2016 |

(Continued)

*Primary Examiner* — Hovhannes Baghdasaryan
(74) *Attorney, Agent, or Firm* — Nields, Lemack & Frame, LLC (57) ABSTRACT

A surveying instrument comprises a monopod installed on a reference point, a surveying instrument main body having a reference optical axis and an operation panel, wherein the surveying instrument main body has a distance measuring unit, an arithmetic control module, a measuring direction image pickup module which acquires a first image, and an attitude detector which detects tilts of two axes of the surveying instrument main body to the horizontal, and wherein the operation panel has a display unit, a calculating module, and as operation module, and the at least either one of the arithmetic control module and the calculating module calculates a tilt angle of the reference optical axis to the horizontal and a tilt angle of the monopod to the vertical, and the at least either one measures a horizontal distance and a vertical distance to the object to be measured with reference to the reference point.

6 Claims, 8 Drawing Sheets

(56) References Cited

U.S. PATENT DOCUMENTS

| | | |
|---|---|---|
| 2016/0259039 A1 | 9/2016 | Ohtomo et al. |
| 2017/0131404 A1 | 5/2017 | Ohtomo et al. |
| 2017/0227357 A1 | 8/2017 | Ohtomo et al. |

FOREIGN PATENT DOCUMENTS

| | | |
|---|---|---|
| JP | 2016-161411 A | 9/2016 |
| JP | 2017-90244 A | 5/2017 |
| JP | 2017-142081 A | 8/2017 |

* cited by examiner

SURVEYING INSTRUMENT

BACKGROUND OF THE INVENTION

The present invention relates to a surveying instrument which can be easily installed.

When surveying is to be performed using a surveying instrument, first, the surveying instrument needs to be installed on a reference point.

In general, when the surveying instrument is to be installed on the reference point, the surveying instrument is installed by using a tripod, and the surveying instrument needs to be leveled horizontally on the tripod and a machine center of the surveying instrument needs to be positioned accurately on a vertical line which passes through the reference point. Further, a height from the reference point to the machine center (an instrument height of the surveying instrument) should be measured. Thus, the installation work of the surveying instrument is complicated and needed time and expertise.

SUMMARY OF THE INVENTION

It is an object of the present invention to provide a surveying instrument which can be installed easily and in a short time and does not need expertise in the installation work.

To attain the object as described above, a surveying instrument according to the present invention comprises a monopod installed on a reference point, a surveying instrument main body provided at a known distance from a lower end of the monopod and at a known angle with respect to an axis of the monopod and having a reference optical axis, and an operation panel provided on the monopod and capable of data-communicating with the surveying instrument main body, wherein the surveying instrument main body has a distance measuring unit for measuring a distance to an object to be measured, an arithmetic control module, a measuring direction image pickup module for acquiring a first image including the object to be measured with a predetermined relationship with respect to the reference optical axis, and an attitude detector for detecting tilts of two axes of the surveying instrument main body with respect to the horizontal, the operation panel has a display unit, a calculating module, and an operation module, and wherein at least either one of the arithmetic control module and the calculating module is configured to calculate a tilt angle of the reference optical axis with respect to the horizontal and a tilt angle of the monopod with respect to the vertical based on a detection result of the attitude detector, and at least either one of the arithmetic control module and the calculating module is configured to measure a horizontal distance and a vertical distance of the object to be measured with reference to the reference point based on the tilt angle of the reference optical axis to the horizontal, the tilt angle of the monopod to the vertical and a distance measurement result of the distance measuring unit.

Further, the surveying instrument according to a preferred embodiment further comprises a lower image pickup module provided at a known position with respect to the surveying instrument main body, wherein the lower image pickup module has a lower image pickup optical axis directed downward and acquires a second image including the lower end of the monopod and its periphery, at least either one of the arithmetic control module and the calculating module is configured to obtain a displacement between the second images due to a rotation around the axis of the monopod, or a tilting around the lower end or a spiral rotation around the lower end, and to calculate a rotation angle of the monopod around the reference point based on the displacement, and at least either one of the arithmetic control module and the calculating module is configured to determine a three-dimensional coordinate of the object to be measured with reference to the reference point based on the rotation angle of the monopod, the tilt angle of the reference optical axis with respect to the horizontal, the tilt angle of the monopod with respect to the vertical, and a distance measurement result of the distance measuring unit.

Further, the surveying instrument according to a preferred embodiment is configured such that the distance measuring unit has a distance measuring light source, an optical axis deflector provided on the reference optical axis, a distance measuring optical axis which coincides with the reference optical axis in a state not deflected by the optical axis deflector, and a protecting direction detecting module, wherein the optical axis deflector has a pair of optical prisms, the pair of optical prisms is capable of deflecting the distance measuring optical axis two-dimensionally by respective rotation control, the projecting direction detecting module is configured to detect a deflecting direction of the distance measuring optical axis based on the respective rotation positions of the optical prisms, the arithmetic control module is configured to control the optical axis deflector so as to scan the distance measuring light two-dimensionally, to obtain the distance measurement result measured along a scanning locus and data of a three-dimensional coordinate based on the rotation angle of the monopod, the tilt angle of the reference optical axis to the horizontal, and tilt angle of the monopod to the vertical and a deflecting direction of the distance measuring optical axis, and wherein at least either one of the arithmetic control module and the calculating module is configured to associate the three-dimensional coordinate along the scanning locus with the first image and to acquire an image with the three-dimensional coordinate with reference to the reference point.

Further, the surveying instrument according to the preferred embodiment is configured such that the first image and the second image are acquired such that an overlap portion is formed, and at least either one of the arithmetic control module and the calculating module is configured to synthesize the first image and the second image and to create an observation image including an area from the reference point to the object to be measured.

Further, the surveying instrument according to the preferred embodiment is configured such that the monopod is capable of extension/contraction for each known length, the surveying instrument main body is mounted on an extension/contraction portion of the monopod, and the lower image pickup module is provided on a fixed portion of the monopod.

Further, the surveying instrument according to the preferred embodiment is configured such that an auxiliary leg which regulates an inclination of the monopod is provided on the monopod.

According to the present invention, the surveying instrument comprises a monopod installed on a reference point, a surveying instrument main body provided at a known distance from a lower end of the monopod and at a known angle with respect to an axis of the monopod and having a reference optical axis, and an operation panel provided on the monopod and capable of data-communicating with the surveying instrument main body, wherein the surveying instrument main body has a distance measuring unit for measuring a distance to an object to be measured, an arithmetic control module, a measuring direction image pickup module for acquiring a first image including the object to be measured with a predetermined relationship with respect to the reference optical axis, and an attitude detector for detecting tilts of two axes of the surveying instrument main body with respect to the horizontal, the operation panel has a display unit, a calculating module, and an operation module, and wherein at least either one of the arithmetic control module and the calculating module is configured to calculate a tilt angle of the reference optical axis with respect to the horizontal and a tilt angle of the monopod with respect to the vertical based on a detection result of the attitude detector, and at least either one of the arithmetic control module and the calculating module is configured to measure a horizontal distance and a vertical distance of the object to be measured with reference to the reference point based on the tilt angle of the reference optical axis to the horizontal, the tilt angle of the monopod to the vertical and a distance measurement result of the distance measuring unit. As a result, the leveling work is not needed, and the measurement can be made only by installing the lower end of the monopod on the reference point.

DETAILED DESCRIPTION OF THE PREFERRED EMBODIMENT

A description will be given on embodiments of the present invention by reference to the attached drawings.

Figure 1:
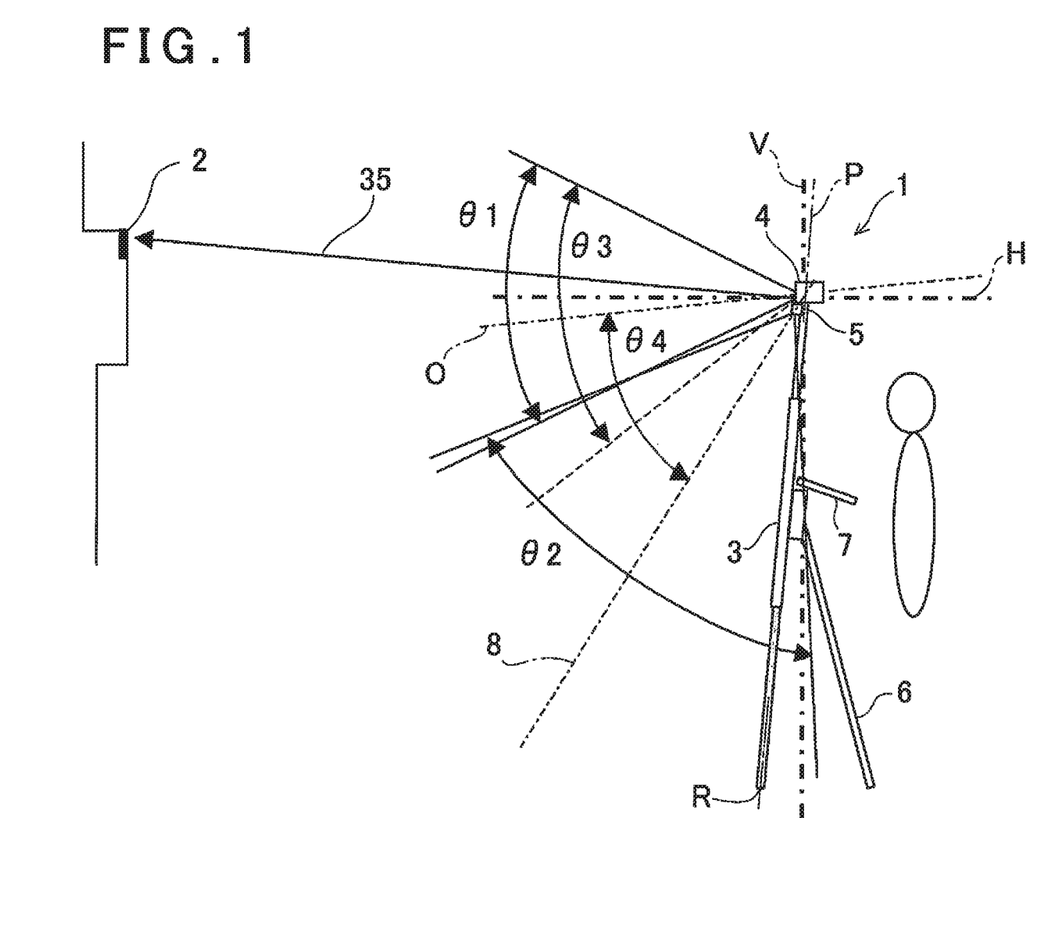
FIG. 1 is a schematical diagram illustrating a first embodiment.

FIG. 1 is a view illustrating an outline of a first embodiment of the present invention, and in FIG. 1, reference numeral 1 denotes a surveying instrument and reference numeral 2 denotes an object to be measured.

The surveying instrument 1 has mainly a monopod 3, a surveying instrument main body 4 provided on an upper end of the monopod 3 and an operation panel 7, and the operation panel 7 is provided at a position where a measurement worker can perform an operation easily in a standing attitude, for example.

The operation panel 7 may be provided in a fixed manner with respect to the monopod 3 or may be attachable detachable. It may be so configured that the operation panel 7 is capable of the operation in a state mounted on the monopod 3, and the operation panel 7 is separated from the monopod 3, and in a state of a single body the operation panel 7 can be operated. The operation panel 7 and the surveying instrument main body 4 are capable of a data communication via various types of the communication means such as the wired and the wireless.

Further, a single auxiliary leg 6 is foldably mounted at a position below the operation panel 7 of the monopod 3.

A lower end of the monopod 3 has a sharp tip, and the lower tip is installed at a reference point R (a point which becomes a reference of the measurement). Further, a distance from the lower end of the monopod 3 to a machine center of the surveying instrument main body 4 (a point which becomes a reference of the measurement) is already-known.

An optical system of the surveying instrument main body 4 has a reference optical axis O extending in a horizontal direction, and the reference optical axis O is set and is tilted downward by a predetermined angle with respect to a line orthogonal to an axis P of the monopod 3. Therefore, when the monopod 3 is set vertically, the reference optical axis O is tilted downward by the predetermined angle with respect to the horizontal.

The auxiliary leg 6 is foldably connected to the monopod 3 at an upper end of the auxiliary leg 6, and in a state where the auxiliary leg 6 is folded the auxiliary leg 6 adheres closely to the monopod 3. A lock mechanism, which holds the close contact state, is provided. Alternatively, in a simplified manner, a band (not shown) bundling the monopod 3 and the auxiliary leg 6 may be provided.

The auxiliary leg 6 is rotatable by a predetermined angle around the upper end and can be fixed at a rotated position. It is to be noted that a case where the number of the auxiliary legs 6 is one is described but it may be two. In this case, the monopod 3 can stand alone.

The surveying instrument main body 4 has a distance measuring unit 24 (as described later) and a measuring direction image pickup module 21 (as described later), and a lower image pickup module 5 is provided on the surveying instrument main body 4. A reference optical axis of an optical system of the distance measuring unit 24 is the reference optical axis O. An optical axis the measuring direction image pickup module 21 (hereinafter a first image pickup optical axis 61) is tilted upward by a predetermined angle (6°, for example) with respect to the reference optical axis O, and a distance and a position relationship between the measuring direction image pickup module 21 and the distance measuring unit 24 are already-known. The distance measuring unit 24 and the measuring direction image pickup module 21 are accommodated in a casing of the surveying instrument main body 4.

The lower image pickup module 5 has an image pickup element such as a CCD and CMOS, and an image pickup device capable of acquiring a digital image is used. Further, a position of a pixel in the image pickup element can be detected with reference to an optical axis of the lower image pickup module 5 (hereinafter a second image pickup optical axis 8). As the lower image pickup module 5, a commercial digital camera can be used, for example.

The lower image pickup module 5 is fixed to the casing of the surveying instrument main body 4, and the lower image pickup module 5 (that is, an image forming position of the lower image pickup module 5) is provided at the known position with respect to the machine center of the surveying instrument main body 4. The second image pickup optical axis 8 is directed downward and set at the predetermined known angle with respect to the reference optical axis O, and the second image pickup optical axis 8 and the reference optical axis O have a known relationship. It is to be noted that the lower image pickup module 5 may be accommodated in the casing and may be integrated with the surveying instrument main body 4.

A field angle of the measuring direction image pickup module 21 is θ1, the field angle of the lower image pickup module 5 is θ2, and θ1 and θ2 may be equal or may be different. Further, the field angle of the measuring direction image pickup module 21 and the field angle of the lower image pickup module 5 do not have to overlap each other but they preferably overlap each other by a predetermined amount. Further, the field angle of the lower image pickup module 5 and the direction of the second image pickup optical axis 8 are set so that the lower end of the monopod 3 is included in the image.

A description will be given on an outline configuration of the surveying instrument main body 4 by referring to FIG. 2.

The surveying instrument main body 4 includes a distance measuring light projecting module 11, a light receiving module 12, a distance measurement, calculating module 13, an arithmetic control module 14, a first storage module 15, an image pickup control module 16, an image processing module 17, a first communication module 18, an optical axis deflector 19, an attitude detector 20, the measuring direction image pickup module 21, a projecting director 22, and a motor driver 23, and they are housed in a casing 25 and integrated. It is to be noted that, the distance measuring light projecting module 11, the light receiving module 12, the distance measurement calculating module 13, the optical axis deflector 19 and the like make up the distance measuring unit 24. The distance measuring unit 24 functions as an electric distance meter.

The distance measuring light projecting module 11 has a projection optical axis 26, and a light emitter 27 such as a laser diode (LD), for example, as a distance measuring light source is provided on the projection optical axis 26. Further, a projecting lens 28 is provided on the projection optical axis 26. Furthermore, the projection optical axis 26 is deflected so as to coincide with a light receiving optical axis 31 by a first reflection mirror 29 as a deflecting optical component (as described later) provided on the projection optical axis 26 and a second reflection mirror 32 as a deflecting optical component provided on the light receiving optical axis 31. The first reflection mirror 29 and the second reflection mirror 32 make up a projection optical axis deflector.

A CPU specialized for this instrument or a general-purpose CPU is used as the distance measurement calculating module 13, the distance measurement calculating module 13 executes a program (as described later) stored in a storage module and performs the distance measurement or the control. It is to be noted that a part of the functions of the arithmetic control module 14 may be assigned as the distance measurement calculating module 13.

The distance measurement calculating module 13 makes the light emitter 27 to emit light, and the light emitter 27 emits a laser beam. The distance measuring light projecting module 11 projects the laser beam emitted from the light emitter 27 as a distance measuring light 33. It is to be noted that, as the laser beam, any one of a continuous light or a pulsed light or an intermittent modulated light (burst-emitted light) disclosed in Japanese Patent Laid-Open No. 2016-161411 may be used.

A description will be given on the light receiving module 12. A reflected distance measuring light 34 from an object to be measured 2 enters into the light receiving module 12. The light receiving module 12 has the light receiving optical axis 31, and the projection optical axis 26 deflected by the first reflection mirror 29 and the second reflection mirror 32 coincides with the light receiving optical axis 31. It is to be noted that axes of a state where the projection optical axis 26 coincides with the light receiving optical axis 31 become a distance measuring optical axis 35.

The optical axis deflector 19 is disposed on the reference optical axis O. A straight optical axis transmitted through a center of the optical axis deflector 19 is the reference optical axis O. The reference optical axis O coincides with the projection optical axis 26, the light receiving optical axis 31 or the distance measuring optical axis 35 when they are not deflected by the optical axis deflector 19.

The reflected distance measuring light 34 is transmitted through the optical axis deflector 19, and a focusing lens 38 is disposed on the incident light receiving optical axis 31. Further, a photodetector 39 such as an avalanche photodiode (APD) is provided on the light receiving optical axis 31. The focusing lens 38 focuses the reflected distance measuring light 34 on the photodetector 39. The photodetector 39 receives the reflected distance measuring light 34 and produces a photodetecting signal. The photodetecting signal is inputted into the distance measurement calculating module 13, and the distance measurement calculating module 13 calculates reciprocating time of the distance measuring light based on the photodetecting signal and performs the distance measurement to the object to be measured 2.

The first communication module 18 transmits image data acquired by the measuring direction image pickup module 21 and the distance measurement data acquired by the distance measuring unit 24 to the operation panel 7 and receives an operation command from the operation panel 7. The first communication module 18 performs the data communication with a second communication module 67 which will be described later by required wired or wireless communication means.

As the first storage module 15, magnetic recording means such as an HD, an FD and the like, optical recording means such as a CD, a DVD and the like, or semiconductor recording means such as a memory card, a USB memory and the like is used. In the first storage module 15, various programs are stored. These programs include: a control program for the image pickup, an image processing program, a distance measurement program, a display program, a communication program, a calculation program and the like. Further, various types of the data such as the distance measurement data, the image data and the like are stored.

Figure 3:
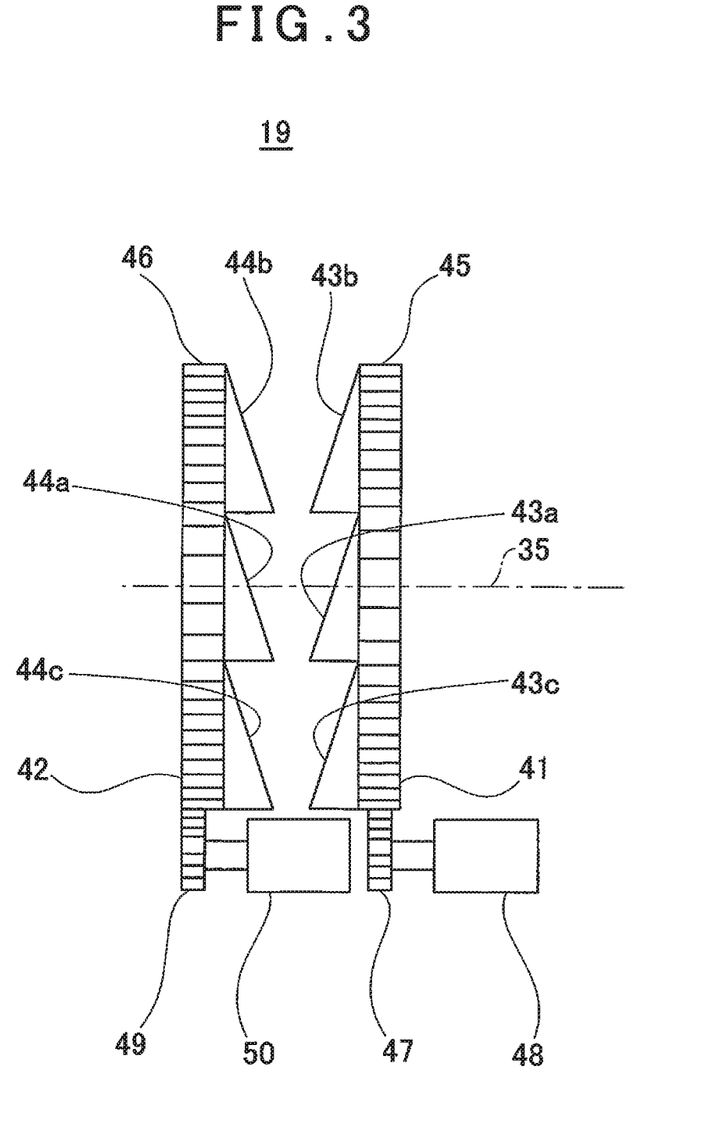
FIG. 3 is an explanatory drawing of an essential part of an optical axis deflector.

A description will be given on the optical axis deflector 19 by referring FIG. 3.

The optical axis deflector 19 is constituted by a pair of optical prisms 41 and 42. The optical prisms 41 and 42 have a disk shape with the same diameter, respectively, are arranged concentrically on the distance measurement optical axis 35 while crossing the distance measurement optical axis 35 at a right angle, and are arranged in parallel at a predetermined interval. The optical prism 41 is formed from the optical glass and has three triangular prisms 43a, 43b, and 43c arranged in parallel. The optical prism 42 is formed from the optical glass and has three triangular prisms 44a, 44b, and 44c arranged in parallel. It is to be noted that the triangular prisms 43a, 43b, and 43c and the triangular prisms 44a, 44b, and 44c all have an optical characteristic of the same deflection angle.

It is to be noted that the widths of the triangular prisms 43a and 44a located at a center are larger than a beam diameter of the distance measuring light 33, and the distance measuring light 33 is adapted to transmit only the triangular prisms 43a and 44a.

A center part of the optical axis deflector 19 (the triangular prisms 43a and 44a) are a distance measuring light deflector which is a first optical axis deflector through which the distance measuring light 33 is transmitted and is projected. A portion excluding the center part of the optical axis deflector 19 (both end portions of the triangular prisms 43a and 44a, the triangular prisms 43b and 43c, and the triangular prisms 44b, and 44c) is a reflected distance measuring light deflector which is a second optical axis deflector through which the reflected distance measuring light 34 is transmitted and enters.

The respect optical prisms 41 and 42 are arranged rotatably individually and independently around the light receiving optical axis 31. The optical prisms 41 and 42 are controlled respectively by the arithmetic control module 14 regarding a rotation direction, a rotating amount and a rotating speed. Thereby, the optical prisms 41 and 42 deflect the projection optical axis 26 of the projected measuring light 33 in an arbitrary direction and also deflect the light receiving optical axis 31 of the received reflected distance measuring light 34 in parallel with the projection optical axis 26.

Outer shapes of the optical prisms 41 and 42 are circular around the distance measuring optical axis 35 (the reference optical axis O), respectively, and diameters of the optical prisms 41 and 42 are set so that a sufficient light amount can be obtained by considering the spread of the reflected distance measuring light 34.

A ring gear 45 is fitted on an outer periphery of the optical prism 41, and a ring gear 46 is fitted on an outer periphery of the optical prism 42.

A driving gear 47 is meshed with the ring gear 45, and the driving gear 47 is fixed to an output shaft of a motor 48. Similarly, a driving gear 49 is meshed with the ring gear 46, and the driving gear 49 is fixed to an output shaft of a motor 50. The motors 48 and 50 are electrically connected to the motor driver 23.

As the motors 48 and 50, motors which are capable of detecting the rotation angle are used or motors which rotate corresponding to a driving input value such as a pulse motor, for example, are used. Alternatively, a rotation angle detector which detects a rotation amount (a rotation angle) of the motor such as an encoder, for example, may be used and the rotation amounts of the motors 48 and 50 may be detected by the rotation angle detector. The rotation amounts of the motors 48 and 50 are detected, respectively, and the motors 48 and 50 are individually controlled by the motor driver 23. It is to be noted that the encoder may be attached directly to the ring gears 45 and 46, respectively, so that the rotation angles of the ring gears 45 and 46 are directly detected by the encoder.

The driving gears 47 and 49 and the motors 48 and 50 are provided at positions not interfering with the distance measuring light projecting module 11 such as at lower positions of the ring gears 45 and 46, for instance.

The projecting lens 28, the first reflection mirror 29, the second reflection mirror 32, the distance measuring light deflector and the like make up a projection optical system. Further, the reflected distance measuring light deflector, the focusing lens 38 and the like make up a light receiving optical system.

The distance measurement calculating module 13 controls the light emitter 27 and makes the light emitter 27 to pulse-emit or burst-emit (intermittently emit) the laser beam as the distance measuring light 33. The projection optical axis 26 (that is, the distance measuring optical axis 35) is deflected by the triangular prisms 43a and 44a (distance measuring light deflectors) so that the distance measuring light 33 is directed toward the object to be measured 2. The distance measurement is performed in a state where the distance measurement optical axis 35 sights the object to be measured 2.

The reflected distance measuring light 34 as reflected from the object to be measured 2 is incident through the triangular prisms 43b and 43c and the triangular prisms 44b and 44c (reflected distance measuring light deflector), and the focusing lens 38 and the reflected distance measuring light 34 is received by the photodetector 39. The photodetector 39 sends out the photodetecting signal to the distance measurement calculating module 13, and the distance measurement calculating module 13 performs the distance measurement of a measuring point (a point irradiated by the distance measuring light) for each pulse light based on the photodetecting signal from the photodetector 39, and the distance measurement data is stored in the first storage module 15.

The projecting direction detecting module 22 counts driving pulses inputted into the motors 48 and 50 and detects the rotation angles of the motors 48 and 50. Alternatively, the projecting direction detecting module 22 detects the rotation angles of the motors 48 and 50 based on a signal from the encoder. Further, the projecting direction detecting module 22 calculates rotational positions of the optical prisms 41 and 42 based on the rotating angles of the motors 48 and 50.

Further, the projecting direction detecting module 22 calculates a deflection angle and the projecting direction of the distance measuring light 33 for each pulse light based on refractive indexes of the optical prisms 41 and 42, the rotational position when the optical prisms 41 and 42 are integrated, and a relative rotating angle between the both optical prisms 41 and 42. A calculation result (an angle measurement result) is associated with the distance measurement result and is inputted into the arithmetic control module 14. It is to be noted that in a case where the distance measuring light 33 is burst-emitted, the distance measurement is performed for each intermittent distance measuring light.

As the arithmetic control module 14, a CPU specialized for this instrument or a general-purpose CPU is used and the arithmetic control module 14 executes a program stored in the first storage module 15 and executes various calculations, the processing such as the creation of the three-dimensional data, and the various controls.

By controlling the rotating directions and the rotating speeds of the motors 48 and 50 and a rotation ratio between the motors 48 and 50, the arithmetic control module 14 controls the relative rotation and the entire rotation of the optical prisms 41 and 42 and controls an operation of deflecting by the optical axis deflector 19. Further, the arithmetic control module 14 calculates a horizontal angle and a vertical angle of the measuring point with respect to the distance measuring optical axis 35 from the deflection angle and the projecting direction of the distance measuring light 33. Further, the arithmetic control module 14 associates the horizontal angle and the vertical angle regarding the measuring point with the distance measurement data and calculates the three-dimensional data of the measuring point and further, can acquire the three-dimensional data of the object to be measured 2. Thus, the surveying instrument 1 functions as a total station.

Subsequently, a description will be given on the attitude detector 20. It is to be noted that as the attitude detector 20, an attitude detector disclosed in Japanese Patent Laid-Open No. 2017-106813 can be used.

The attitude detector 20 will be described in brief. The attitude detector 20 has a frame 54. The frame 54 is fixed to the casing 25 or fixed to a structural component and is integrated with the surveying instrument main body 4.

A sensor block 55 is mounted on the frame 54 via a gimbal. The sensor block 55 is rotatable by 360° in two directions around two axes crossing each other at a right angle, respectively.

A first tilt sensor 56 and a second tilt sensor 57 are mounted on the sensor block 55. The first tilt sensor 56 is a sensor which detects the horizontal with high accuracy, for instance, a tilt detector which causes a detection light to enter a horizontal liquid surface, and detects the horizontal according to a change of a reflection angle of a reflected light or an air bubble tube which detects the tilt according to a positional change of sealed air bubbles. Further, the second tilt sensor 57 is a sensor which detects a tilt change with high responsiveness, for instance an acceleration sensor.

Each of relative rotating angles of the two axes of the sensor block 55 with respect to the frame 54 are configured to be detected by encoders 58 and 59, respectively.

Further, motors (not shown) which rotate the sensor block 55 in order to maintain the sensor block horizontally are provided in relation with the 2 axes, respectively. The motors are controlled by the arithmetic control module 14 so that the sensor block 55 is maintained horizontally based on detection results from the first tilt sensor 56 and the second tilt sensor 57.

When the sensor block 55 is tilted (if the surveying instrument main body 4 is tilted), the relative rotating angle of each axial direction of the frame 54 to the sensor block 55 (horizontal) is detected by the encoders 58 and 59, respectively. Based on the detection results of the encoders 58 and 59, the tilt angles of the surveying instrument main body 4 with respect to the 2 axes are detected and the tilt direction of the surveying instrument main body 4 is determined by combining the tilts of the 2 axes.

The sensor block 55 is rotatable by 360° with respect to the 2 axes and hence, whatever the attitude detector 20 takes any attitude or even if the attitude detector 20 is inverted upside down, for example, the attitude detector 20 is capable of the attitude detection (the tile angle and the tilting direction with respect to the horizontal) in all the directions.

In the attitude detection, in a case where high responsiveness is required, the attitude detection and the attitude control are performed based on the detection result of the second tilt sensor 57, but the second tilt sensor 57 has the detection accuracy poorer than the first tilt sensor 56 in general.

The attitude detector 20 includes the first tilt sensor 56 with high accuracy and the second tilt sensor 57 with high responsiveness. Thereby it is possible to perform the attitude control based on the detection result of the second tilt sensor 57 and further, to perform the attitude detection with high accuracy by the first tilt sensor 56.

The detection result of the second tilt sensor 57 can be calibrated based on the detection result of the first tilt sensor 56. If a deviation is caused between the values of the encoders 58, 59 of when the first tilt sensor 56 detects the horizontal (that is, the actual tilt angle) and the tilt angle detected by the second tilt sensor 57, the tilt angle of the second tilt sensor 57 can be calibrated based on the deviation.

Therefore, if the relationship between the detected tilt angle of the second tilt sensor 57 and the tilt angle, which is obtained based on the horizontal detection by the first tilt sensor 56 and the detection results of the encoders 58 and 59, is obtained in advance, the tilt angle detected by the second tilt sensor 57 can be calibrated (calibration), and the accuracy of the attitude detection with the high responsiveness by the second tilt sensor 57 can be improved. In a state where there is a small environmental change (a temperature or the like), the tilt detection may be acquired by the detection result of the second tilt sensor 57 and a correction value.

The arithmetic control module 14 controls the motor based on the signal from the second tilt sensor 57 when the tilt fluctuation is large and when the tilt change is fast. Further, the arithmetic control module 14 controls the motor based on the signal from the first tilt sensor 56 when the tilt fluctuation is small and when the tilt change is mild, that is, in a state where the first tilt sensor 56 is capable of following. It is to be noted that by calibrating the tilt angle detected by the second tilt sensor 57 at all times, the attitude detection by the attitude detector 20 may be performed based on the detection result from the second tilt sensor 57.

In the first storage module 15, the comparison data indicating a comparison result between the detection result of the first tilt sensor 56 and the detection result of the second tilt sensor 57 is stored. The detection result by the second tilt sensor 57 is calibrated based on the signal from the first tilt sensor 56. By means of this calibration, the detection result by the second tilt sensor 57 can be improved to the detection accuracy of the first tilt sensor 56. Thus, in the attitude detection by the attitude detector 20, the high responsiveness can be realized while the high accuracy is maintained.

The measuring direction image pickup module 21 has the first image pickup optical axis 61 in parallel with the reference optical axis O of the surveying instrument main body 4 and an image pickup lens 62 arranged on the first image pickup optical axis 61. The measuring direction image pickup module 21 is a camera having a field angle 50° to 60°, for instance, substantially equal to a maximum deflection angle θ/2 (±30°, for instance) of the optical prisms 41 and 42. The relationship among the first image pickup optical axis 61, the projection optical axis 26, and the reference optical axis O is already-known, the first image pickup optical axis 61, the projection optical axis 26, and the reference optical axis O are in parallel, and the distance between each of the optical axes has a known value.

Further, the measuring direction image pickup module 21 is capable of acquiring a still image, a continuous image or a moving image. The image acquired by the measuring direction image pickup module 21 is transmitted to the operation panel 7 and is displayed on the display unit 68 (which will be described later) of the operation panel 7, and the operator observes the image displayed on the display unit 68 and can perform the measurement work.

The image pickup control module 16 controls an image pickup of the measuring direction image pickup module 21. In a case where the measuring direction image pickup module 21 picks up the moving image or the continuous image, the image pickup control module 16 synchronizes the timing of obtaining a frame image constituting the moving image or the continuous image with the timing of scanning by the surveying instrument main body 4. The arithmetic control module 14 also performs associating the image with the measurement data (distance measurement data, the angle measurement data). Further, the image pickup control module 16 performs a synchronization control of the image pickup timing between the measuring direction image pickup module 21 and the lower image pickup module 5 via the first communication module 18 and a second communication module 67.

An image pickup element 63 of the measuring direction image pickup module 21 is a CCD or a CMOS sensor which is a collection of pixels and each pixel can specify a position on the image pickup element 63. Each pixel has a pixel coordinate in a coordinate system with the first image pickup optical axis 61 as an origin, for instance. The photodetecting signal from each pixel includes an information of the pixel coordinates. Therefore, a position of each pixel on the image pickup element 63 is specified by the pixel coordinate included in the photodetecting signal. Further, since the relationship between the first image pickup optical axis 61 and the reference optical axis O is already-known, the mutual association between the measuring position by the distance measuring unit 24 and the position on the image pickup element 63 can be made. The image signal outputted from the image pickup element 63 is inputted into the image processing module 17 via the image pickup control module 16.

A description will be given on a deflection action and a scanning action of the optical axis deflector 19 by referring to FIG. 4A, FIG. 4B, and FIG. 4C.

Figure 4A:
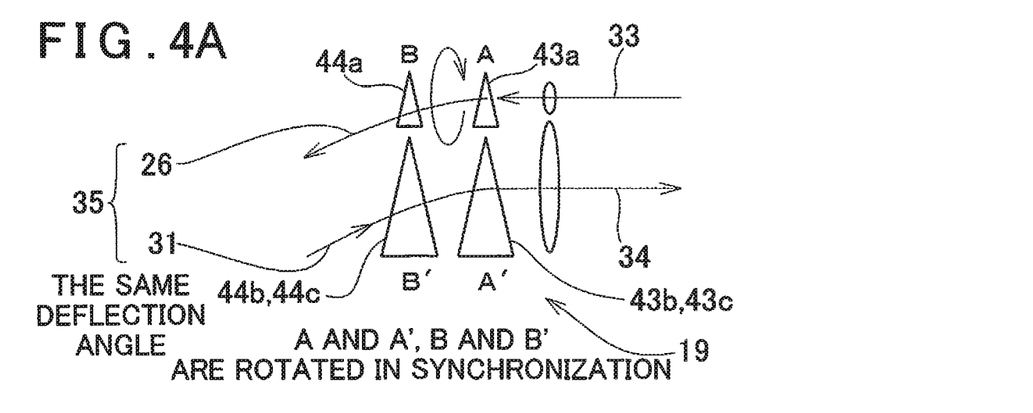
FIG. 4A, FIG. 4B, and FIG. 4C are action explanatory drawings of the optical axis deflector.

For simplification of the description in FIG. 4A, regarding the optical prisms 41 and 42, the triangular prisms 43*a* and 44*a* are separated from the triangular prisms 43*b*, 43*c*, 44*b*, and 44*c*. Further, FIG. 4A illustrates a state where the triangular prisms 43*a* and 44*a* and the triangular prisms 43*b*, 43*c*, 44*b*, and 44*c* are positioned in the same direction, and a maximum deflection angle (e.g. 30°) is obtained in this state. Further, a minimum deflection angle is a position where either one of the optical prisms 41 and 42 is rotated by 180°, the mutual optical actions of the optical prisms 41 and 42 are offset, and the deflection angle becomes 0°. Therefore, the optical axis of the laser beam (the distance measuring optical axis 35) projected and received via the optical prisms 41 and 42 coincide with the reference optical axis O.

The distance measuring light 33 is emitted from the light emitter 27, the distance measuring light 33 is made parallel fluxes by the projecting lens 28. The distance measuring light 33 is transmitted through the distance measuring light deflector (the triangular prisms 43*a* and 44*a*) and is projected toward the object to be measured 2. Here, since the distance measuring light 33 is transmitted through the distance measuring light deflector, the distance measuring light 33 is deflected by the triangular prisms 43*a* and 44*a* to a required direction and projected (FIG. 4A).

The reflected distance measuring light 34 reflected by the object to be measured 2 transmits through the reflected distance measuring light deflector and enters and is focused on the photodetector 39 by the focusing lens 38.

Since the reflected distance measuring light 34 is transmitted through the reflected distance measuring light deflector, the optical axis of the reflected distance measuring light 34 is deflected by the triangular prisms 43*b* and 43*c* and the triangular prisms 44*b* and 44*c* so as to coincide with the light receiving optical axis 31 (FIG. 4A).

The deflecting direction and the deflection angle of the distance measuring light 33 as projected can be arbitrarily changed by the combination of the rotational positions of the optical prism 41 and the optical prism 42.

Figure 2:
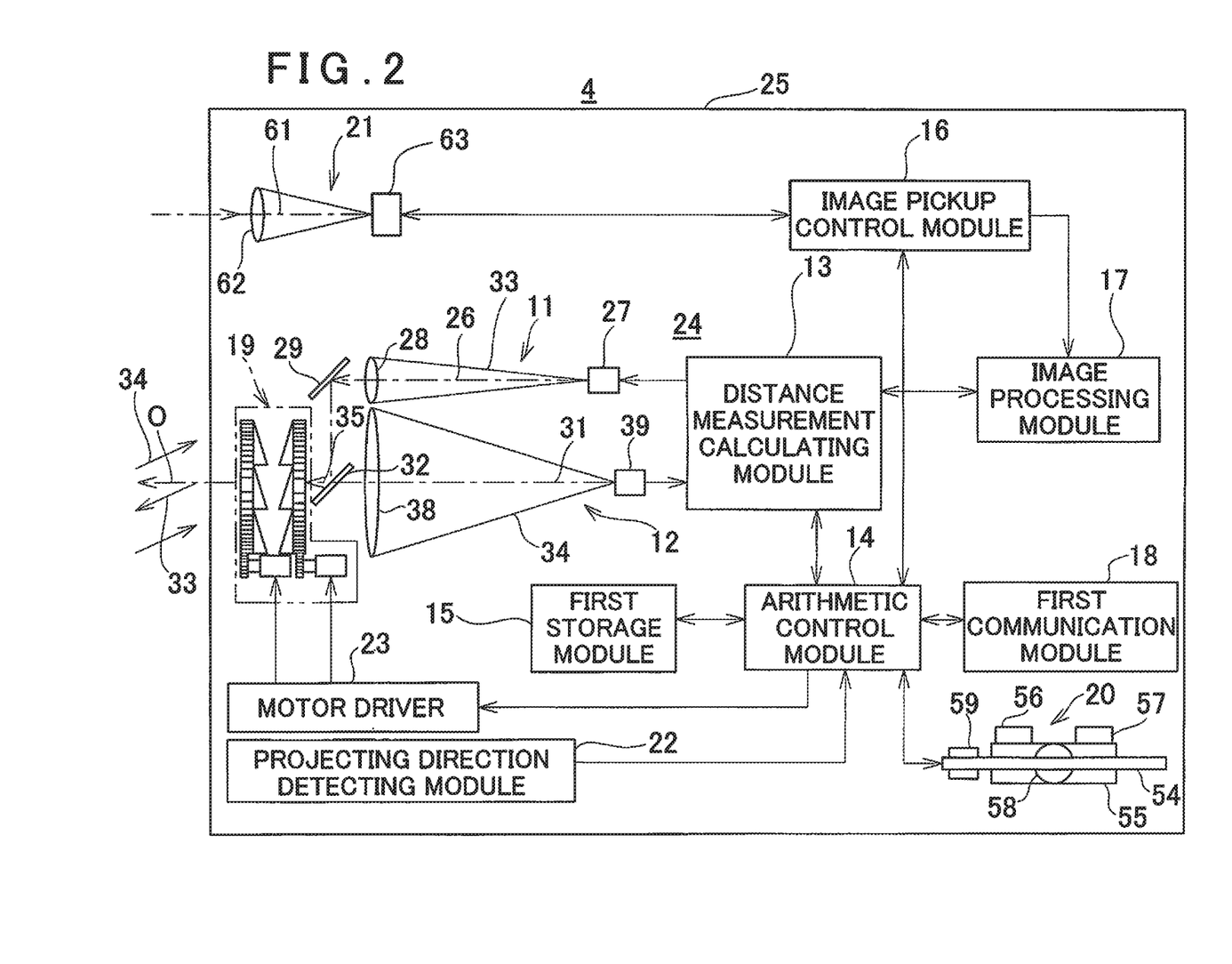
FIG. 2 is a schematical block diagram illustrating a surveying instrument main body.

Further, when the optical prism 41 and the optical prism 42 are integrally rotated by the motors 48 and 50 in a state where the positional relationship between the optical prism 41 and the optical prism 42 is fixed (in a state where the deflection angle as obtained by the optical prism 41 and the optical prism 42 is fixed), the locus drawn by the distance measuring light 33 as transmitted through the distance measuring light deflector becomes a circle around the reference optical axis O (see FIG. 2).

Therefore, if the optical axis deflector 19 is rotated while the laser beam is emitted from the light emitter 27, the distance measuring light 33 is allowed to perform the scanning with the circular locus. It is needless to say that the reflected distance measuring light deflector is integrally rotated with the distance measuring light deflector.

Figure 4B:
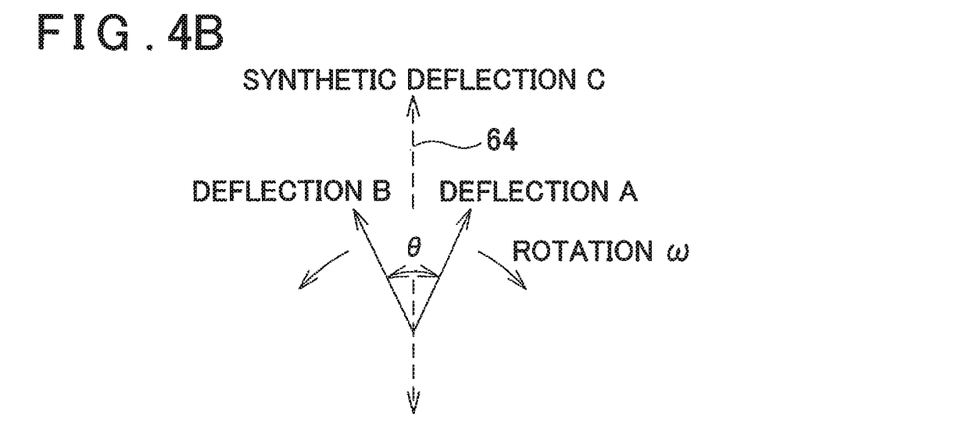

FIG. 4B illustrates a case where the optical prism 41 and the optical prism 42 are relatively rotated. Assuming that the deflecting direction of the optical axis deflected by the optical prism 41 is the deflection A and the deflecting direction of the optical axis deflected by the optical prism 42 is the deflection B, the deflection of the optical axis by the optical prisms 41 and 42 becomes a synthesized deflection C as an angular difference θ between the optical prisms 41 and 42.

Therefore, when the optical prism 41 and the optical prism 42 are reversely synchronized and rotated to-and-fro at an equal speed, the distance measuring light 33 transmitted through the optical prisms 41 and 42 is scanned linearly. Therefore, the distance measuring light 33 is allowed to perform the reciprocal scanning with a linear locus 64 in the synthesized deflection C direction as illustrated in FIG. 4B by rotating to-and-fro the optical prism 41 and the optical prism 42 reversely at the equal speed.

Figure 4C:
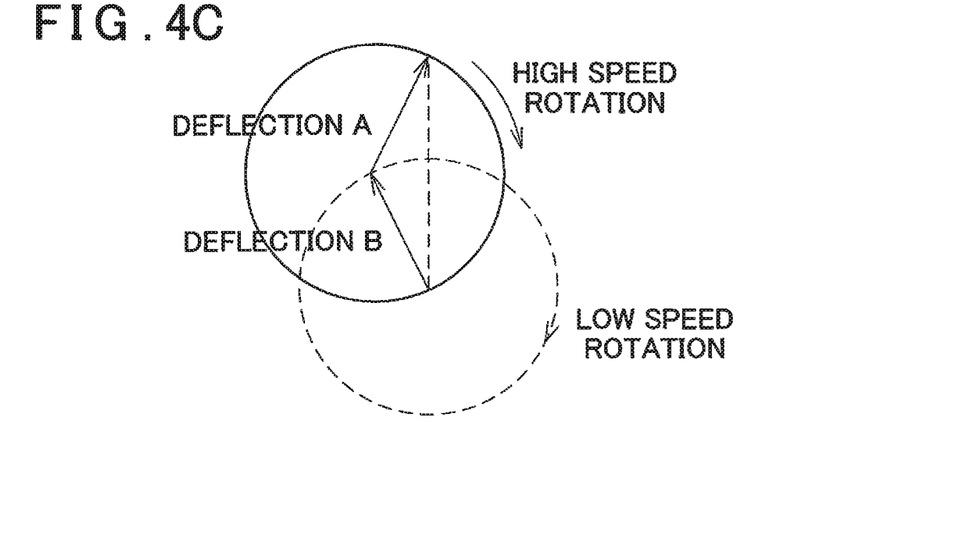

Further, as illustrated in FIG. 4C, when the optical prism 42 is rotated at a rotating speed slower than the rotating speed of the optical prism 41, the distance measuring light 33 is rotated while the angular difference θ is gradually increased. Therefore, the scan locus of the distance measuring light 33 becomes spiral.

Further, by individually controlling the rotating directions and the rotating speeds of the optical prism 41 and the optical prism 42, various two-dimensional scanning patterns of the scanning locus of the distance measuring light 33 with the reference optical axis O as a center can be obtained.

Figure 6:
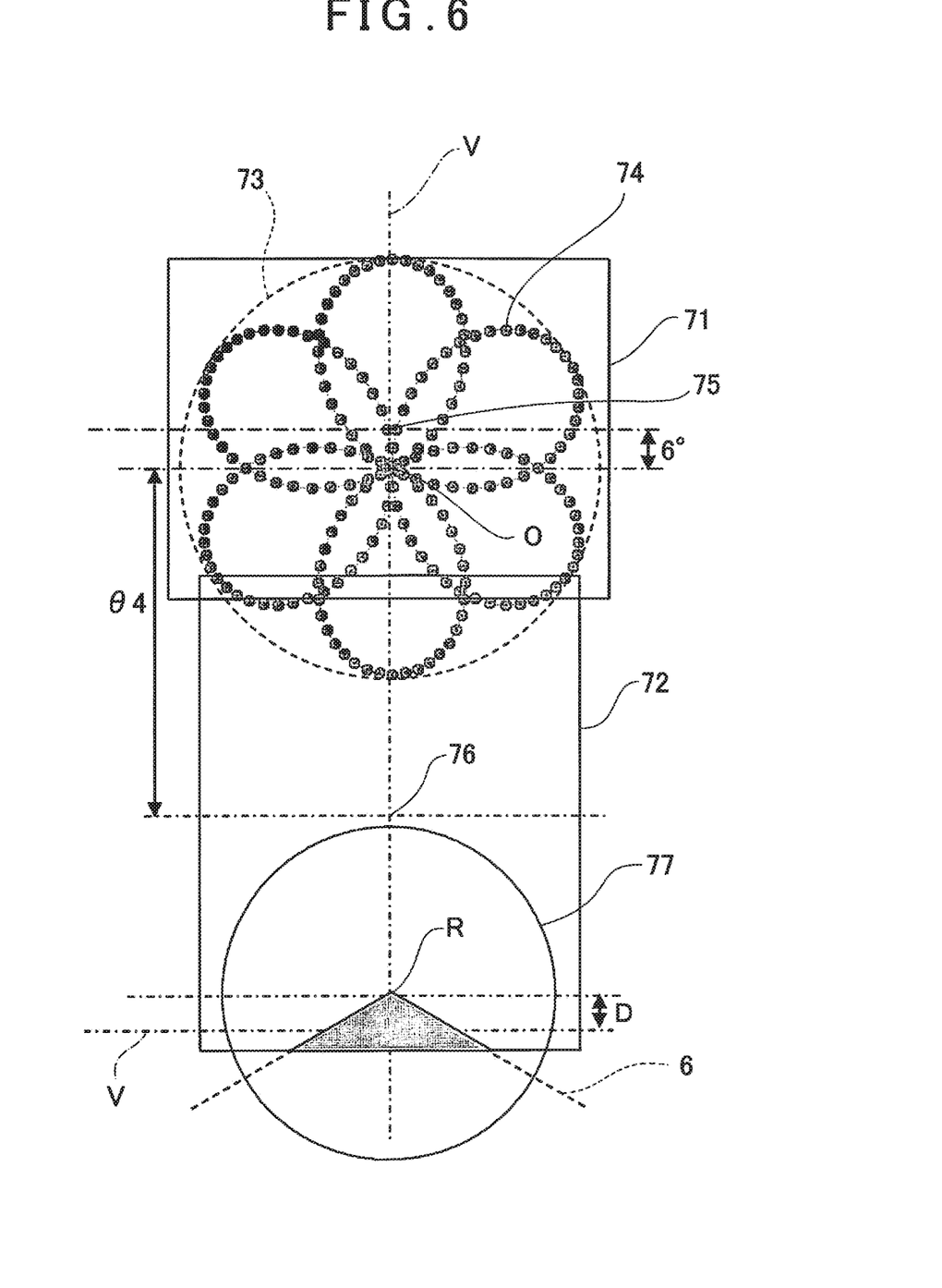
FIG. 6 is a view illustrating a relationship between images obtained by a measuring direction image pickup module and a lower image pickup module and a scanning locus by the surveying instrument main body.

For example, when the one optical prism 41 in the optical prism 41 and the optical prism 42 is rotated by 25 rotations and the other optical prism 42 is rotated by 5 rotations in the opposite direction, a flower petal-shaped two-dimensional closed loop scan pattern (flower petal pattern 74 (a hypotrochoid curve)) as illustrated in FIG. 6 is obtained.

A description will be given on the lower image pickup module 5.

The lower image pickup module 5 is electrically connected to the surveying instrument main body 4, and the image data acquired by the lower image pickup module 5 is inputted into the surveying instrument main body 4.

The image pickup of the lower image pickup module 5 is synchronously controlled with an image pickup of the measuring direction image pickup module 21 and a distance measurement of the distance measuring unit 24 by the image pickup control module 16. The lower image pickup module 5 is provided at the already-known position with respect to the machine center of the surveying instrument main body 4, and the distance between the lower image pickup module 5 and the lower end of the monopod 3 is also already-known.

Further, there is a known relationship between the second image pickup optical axis 8 of the lower image pickup module 5 and the reference optical axis O, and the image data acquired by the lower image pickup module 5 is associated with the image as obtained by the measuring direction image pickup module 21 and the distance measurement data as measured by the distance measuring unit 24, and stored in the first storage module 15 by the arithmetic control module 14.

Figure 5:
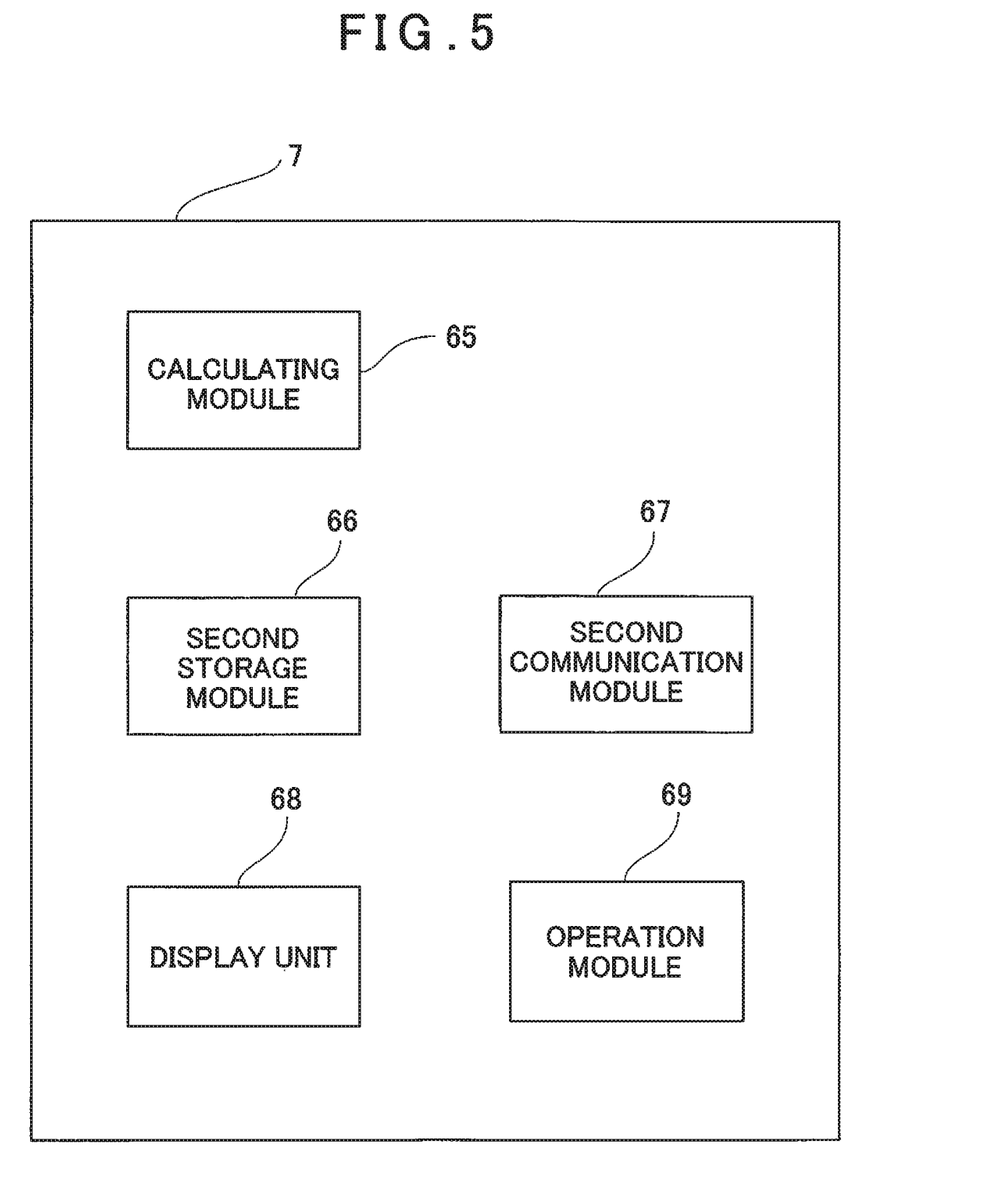
FIG. 5 is a schematical block diagram of an operation panel.

A description will be given on the operation panel 7 in brief by referring to FIG. 5.

The operation panel 7 may be provided in a fixed manner to the monopod 3 as described above or may be detachable. Further, in a case where the operation panel 7 is detachable, the operation panel 7 may be removed from the monopod 3, and in a state of the operation panel 7 only, the worker may hold and operate the operation panel.

The operation panel 7 mainly comprises a calculating module 65, a second storage module 66, the second communication module 67, the display unit 68 and an operation module 69. It is to be noted that the display unit 68 may be a touch panel, and the display unit 68 may also serve as the operation module 69. Further, in a case where the display unit 68 is made the touch panel, the operation module 69 may be omitted. As the calculating module 65, a CPU specialized in this instrument or a general-purpose CPU is used and the CPU executes programs stored in the second storage module 66 and performs a calculation, a processing, and a control.

As the second storage module 66, the magnetic recording means such as an HD, an FD and the like, the optical recording means such as a CD, a DVD and the like, or semiconductor recording means such as a memory card, a USB memory and the like is used.

Various programs are stored in the second storage module 66. These programs includes a communication program for performing a communication with the surveying instrument main body 4, an image processing program for performing a processing such as synthesizing of an image acquired by the lower image pickup module 5 and an image acquired by the measuring direction image pickup module 21, a display program for displaying the image acquired by the lower image pickup module 5, the image acquired by the measuring direction image pickup module 21, and a measurement information measured by the distance measuring unit 24 on the display unit 68, a command creation program for creating a command for the surveying instrument main body 4 based on an information operated by the operation module 69, and the like.

Further, in the second storage module 66, the data such as the image data acquired by the lower image pickup module 5, the image data acquired by the measuring direction image pickup module 21, the measurement information measured by the distance measuring unit 24, and the like, may be stored.

The second communication module 67 communicates a data such as the measurement data, an image data, a command, and the like, with the image processing module 17 via the arithmetic control module 14 and the first communication module 18.

The display unit 68 displays a measuring state, measurement results and the like, of the surveying instrument main body 4 and displays images acquired by the lower image pickup module 5 and the measuring direction image pickup module 21. The operation module 69 is configured such that various commands such as a command relating to a measurement work can be inputted from the operation module 69 to the surveying instrument main body 4.

As the operation panel 7, a smartphone or a tablet may be used, for example. Further, the operation panel 7 may be used as a data collector.

A description will be given on the measuring operation of the surveying instrument 1 by referring to FIG. 1, FIG. 2, FIG. 3, FIG. 4, FIG. 5, and FIG. 6. The following measuring operation is performed by the arithmetic control module 14 which executes the program stored in the first storage module 15.

As the preparation for starting the measurement, the lower end of the monopod 3 is positioned at the reference point R, and the monopod 3 is made substantially vertically and held by the worker. It is to be noted that the operation panel 7 remains in a state mounted on the monopod 3. Further, the surveying instrument 1 is installed in a condition where the lower image pickup module 5 and the measuring direction image pickup module 21 operate.

The monopod 3 is rotated around the lower end of the monopod 3 or the monopod 3 is tilted front and rear, right and left or spirally rotated and further, by using the optical axis deflector 19 of the surveying instrument main body 4 the distance measuring light 33 is directed toward the object to be measured 2. The distance measuring light 33 is directed toward the object to be measured 2, and the picked-up image of the measuring direction image pickup module 21 is displayed on the display unit 68, the direction of the distance measuring light 33 is displayed on the picked-up image.

The measurement worker may hold the monopod 3 in a state where the distance measuring light 33 is matched with the object to be measured 2 or the auxiliary leg 6 is pulled out and the monopod 3 may be supported by the auxiliary leg 6.

By supporting the monopod 3 by the auxiliary leg 6, an inclination (tilt with respect to the vertical) of the monopod 3 in the front-and-rear direction or the rotation around the lower end of the monopod 3 is regulated and a support state of the surveying instrument 1 becomes stable.

It is to be noted that the tilt of the surveying instrument 1 with respect to the horizontal is detected by the attitude detector 20 in real time and thus, the tilt angle and the tilt direction of the surveying instrument 1 with respect to the horizontal is detected in real time, and the measurement result can be corrected in real time based on the detection result. Therefore, a leveling work for adjusting the surveying instrument 1 to the horizontal is not needed or the fluctuation of the tilt angle caused by a slight swing, or the like, generated by the holding of the monopod 3 by the worker can be also corrected in real time.

Next, a description will be given on a detection of a rotating angle around the lower end of the monopod 3 by referring to FIG. 6.

In FIG. 6, reference numeral 71 denotes a first image obtainment range of the measuring direction image pickup module 21, reference numeral 72 denotes a second image obtainment range of the lower image pickup module 5, reference numeral 73 denotes a deflection range of the distance measuring optical axis 35 by the optical axis deflector 19 and reference numeral 74 denotes a locus of a case where a distance measuring light is scanned with the flower petal pattern by the optical axis deflector 19 while irradiating the distance measuring light at plural times. Dots indicated in the flower petal pattern 74 show irradiation points of the distance measuring light of plural times. Further, reference numeral 75 denotes an image center of the first image acquiring range 71 (the image center 75 coincides with the first image pickup optical axis 61), and reference numeral 76 denotes the image center of the second image acquiring range 72 (the image center 76 coincides with the second image pickup optical axis 8).

Further, in FIG. 1, reference character θ1 denotes a field angle of the measuring direction image pickup module 21, θ2 denotes a field angle of the lower image pickup module 5, and θ3 denotes a scan range of the surveying instrument main body 4, respectively.

Further, FIG. 6 illustrates a state where an angle between the first image pickup optical axis 61 and the second image pickup optical axis 8 is set to e.g. 60°, and the reference optical axis O is tilted downward by e.g. 6° with respect to the first image pickup optical axis 61, that is, θ4 is 54°, further, a state where the monopod 3 is held by tilting rearward (a direction separated away from the object to be measured 2) by 5°.

The second image pickup optical axis 8 is directed downward, and the image obtainment range is set so that the lower end of the monopod 3 is included. Therefore, the image obtained by the lower image pickup module 5 includes the reference point R, and further, the image in the range on the measurer side (a range of approximately 80° in the illustration) is included.

A circular image with a predetermined radius around this reference point R is set a rotation detection image 77 and the rotation detection image 77 is acquired in real time.

The rotation detection image 77 at the start of the measurement is acquired, and the rotation detection image 77 is set as a rotation reference image 77*a*.

In a case where a rotating angle after the start of the measurement is detected, a rotation change of the rotation detection image 77 is detected with respect to the rotation reference image 77*a* around the reference point R, and the rotating angle is calculated based on the rotation change. The rotating angle is converted to a horizontal angle based on the detection result of the attitude detector 20. It is to be noted that the detection of the horizontal angle (the calculation of the horizontal angle) may be performed by applying the projection conversion to the rotation detection image 77 based on the detection result of the attitude detector 20, converting the rotation detection image 77 to the horizontal image and then, detecting a horizontal rotation change.

It is to be noted that the calculation of the rotating angle and the calculation of the horizontal angle may be performed by the arithmetic control module 14 or may be performed by the calculating module 65.

Subsequently, as illustrated in FIG. 1, when the object to be measured 2 is measured by the surveying instrument main body 4, a slope distance to the object to be measured 2 is measured and further, the deflection angle of the reference optical axis O (6° in FIG. 6) to the first image pickup optical axis 61 and the deflection angle of the distance measuring optical axis 35 to the reference optical axis O are detected by the projecting direction detecting module 22, and the tilt angle of the surveying instrument main body 4 to the horizontal is detected by the attitude detector 20, the tilt angle of the distance measuring optical axis 35 with respect to the horizontal is calculated, and the horizontal rotation change of the monopod 3 is determined from the rotation detection image 77.

The slope distance is corrected to the horizontal distance based on the tilt angle of the distance measuring optical axis 35 with respect to the horizontal, and the directional angle is calculated based on the tilt angle of the distance measuring optical axis 35 with respect to the horizontal and the detected horizontal angle. Further, since the length of the monopod 3 and the inclination of the monopod 3 with respect to the first image pickup optical axis 61 are already-known, the three-dimensional coordinate of the object to be measured 2 with reference to the lower end of the monopod 3 (that is, the reference point R) is acquired.

It is to be noted that, the calculations such as the calculation of the horizontal angle, the calculation of the tilt angle of the distance measuring optical axis 35, and the calculation of the horizontal distance may be performed by the arithmetic control module 14 or may be performed by the calculating module 65.

In the description above, the measurement is performed by operation similar to the total station in a condition where the distance measuring optical axis 35 is fixed, but the measurement can be also made as a laser scanner.

As illustrated in FIG. 6, the optical axis deflector 19 can freely deflect the distance measuring optical axis 35 within a range of the deflection range 73. By controlling the rotation of the optical prism 41 and the optical prism 42 the scanning with the locus of the flower petal pattern 74 can be performed. The distance measurement data can be obtained along the locus of the flower petal pattern 74 by irradiating a pulse distance measuring light during a scan process. Further, in order to increase a distance measurement data density, it is necessary that the flower petal pattern 74 is rotated in a circumferential direction by a predetermined angle each time the flower petal pattern 74 is scanned for one pattern. Further, the first image and the second image are obtained synchronously with the scanning.

Further, when a scan center is to be changed (when a scan range is to be changed), the monopod 3 is rotated around the axis, or the monopod 3 is spirally rotated around the lower end, or an inclination angle of the monopod 3 is changed. Then, the distance measurement data in a desired direction within a desired range can be easily obtained.

Further, in the case of synthesizing a first mage acquired by the measuring direction image pickup module 21 and a second image obtained by the lower image pickup module 5, the synthesizing can be performed by using an overlap portion of the both images. Alternatively, as illustrated in FIG. 6, a scanning is performed so that a part of the flower petal pattern 74 is included in the second image obtainment range 72, and the first image and the second image can be synthesized immediately by using the distance measurement data along the locus in the first image and the distance measurement data along the locus in the second image.

As the data along the locus used for the synthesizing, the data along the loci included common to the first image and the second image may be used, or the first image and the second image may be synthesized by using a coordinate value of the data along the loci included individually in the first image and the second image.

By synthesizing the first image and the second image, an observation image of a wide range, which includes an area from the reference point R to the object to be measured 2, can be acquired the confirmation of the measurement range and the measuring position is facilitated, and the workability is improved. Further, an image with the three-dimensional data can be obtained by associating the first image or the synthesized image with the data along the locus obtained by the two-dimensional scanning.

Figure 7:
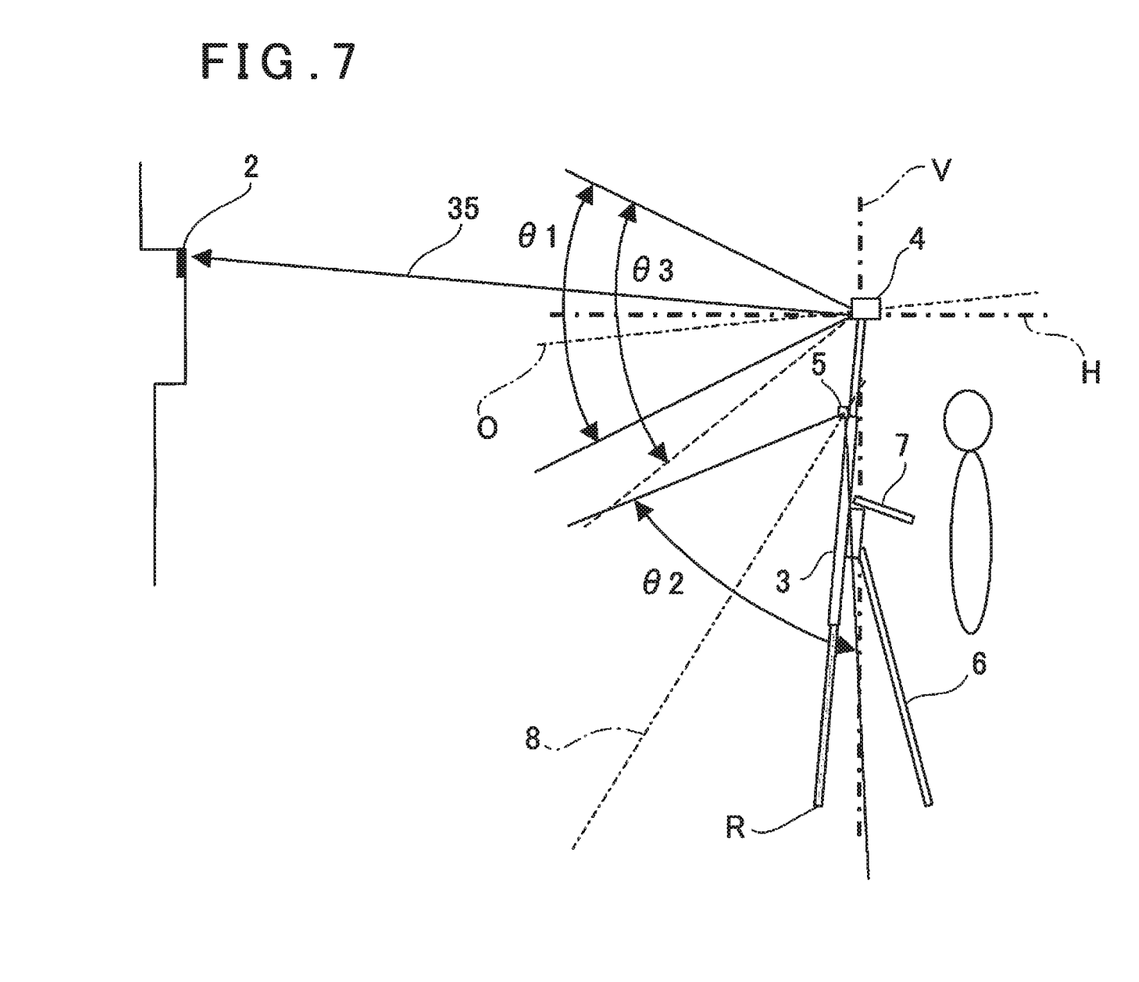
FIG. 7 is a schematic diagram illustrating a second embodiment.

FIG. 7 shows a second embodiment. In FIG. 7, those equivalent to those illustrated in FIG. 1 are given the same reference numerals, and a description will be omitted.

In the second embodiment, the monopod 3 is capable of extension/contraction, and the monopod 3 has a structure capable of extension/contraction at a known predetermined interval (10-cm interval, for instance) and of fixing an extended/contracted length.

Further, the second embodiment is configured such that a lower image pickup module 5 is capable of separating from a surveying instrument main body 4, the surveying instrument main body 4 is mounted on an extension/contraction portion of the monopod 3, the lower image pickup module 5 is mounted on a fixed portion of the monopod 3, and when the monopod 3 is extended/contracted, only the height of the surveying instrument main body 4 is changed.

In the second embodiment, the height of the surveying instrument main body 4 can be changed correspondingly to the height of the object to be measured 2, and the correction of the distance measurement data, or the like, is facilitated.

Figure 8:
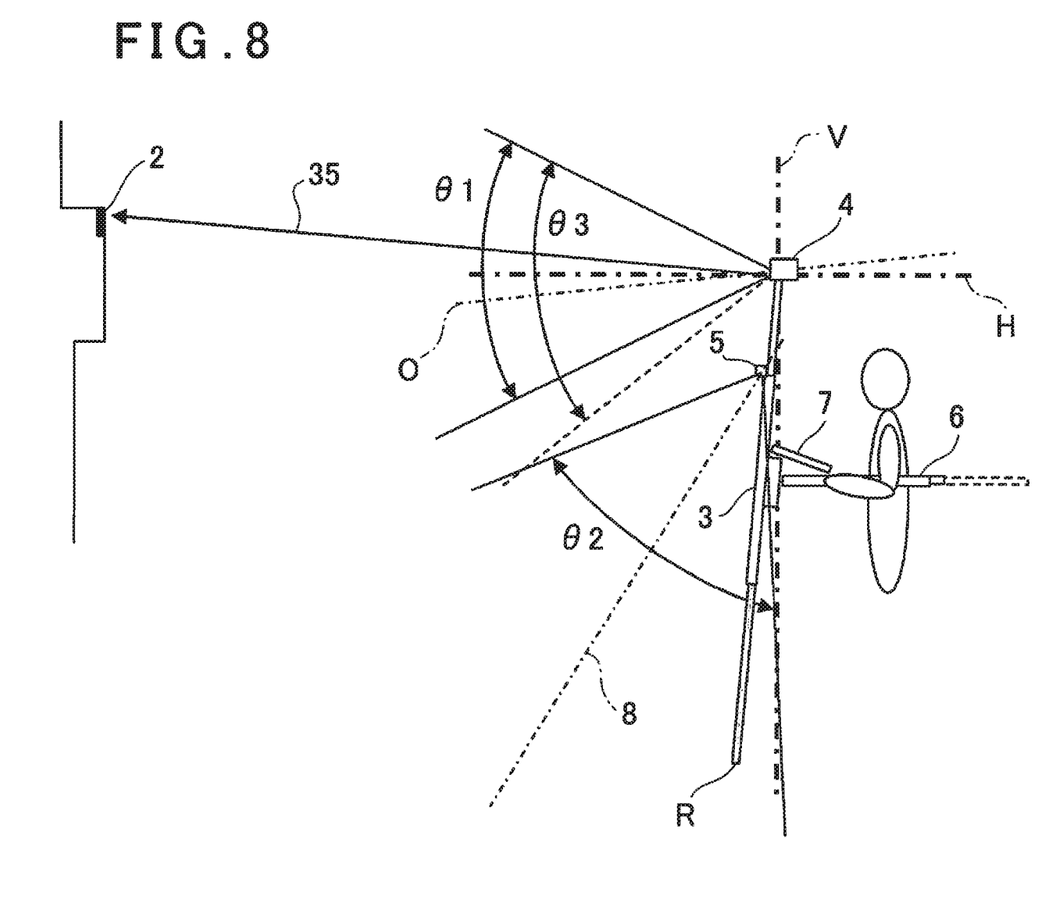
FIG. 8 is a schematic diagram illustrating a third embodiment.

FIG. 8 illustrates a third embodiment. In FIG. 8, those equivalent to those illustrated in FIG. 1 are given the same reference numerals, and the description will be omitted.

In the third embodiment, a rotation range of the auxiliary leg 6 is enlarged, and an auxiliary leg 6 is rotatable substantially to the horizontal or to the horizontal or more. Further, the auxiliary leg 6 has a structure capable of extension/contraction.

As a first aspect of a measuring work in the third embodiment, the auxiliary leg 6 is shortened, the auxiliary leg 6 is held under the arm of the worker, and the monopod 3 is fixed. In the third embodiment, the both hands of the worker are free, and the work with the both hands is made possible. Further, the auxiliary leg 6 can be used as a handle in the rotation around the axis of the monopod 3 or the tilting or the spiral rotation around the lower end, and the workability is improved.

It is to be noted that in the embodiments as described above, the surveying instrument main body 4 having the optical axis deflector 19 and capable of the two-dimensional scanning is used as the surveying instrument main body, but a surveying instrument main body having only a distance measuring function may be provided. In this case, the scanning data cannot be obtained, but the installation work of the surveying instrument 1 such as a leveling work is not needed but the installation is easy, and it is possible to measure a three-dimensional coordinate of a measuring point as described.

Further, in this case, a commercial laser distance meter can be used as a surveying instrument main body 4, and the surveying instrument 1 can be constituted inexpensively.

The invention claimed is:

1. A surveying instrument comprising: a monopod installed on a reference point, a surveying instrument main body provided at a known distance from a lower end of said monopod and at a known angle with respect to an axis of said monopod and having a reference optical axis, and an operation panel provided on the monopod and capable of data-communicating with said surveying instrument main body, wherein said surveying instrument main body has a distance measuring unit for projecting a distance measuring light and measuring a distance to an object to be measured based on a reflected distance measuring light from said object to be measured, an arithmetic control module, a measuring direction image pickup module for acquiring a first image including said object to be measured with a predetermined relationship with respect to the reference optical axis, and an attitude detector for detecting tilts of two axes of said surveying instrument main body with respect to the horizontal, said operation panel has a display unit, a calculating module, and an operation module, and wherein at least either one of said arithmetic control module and said calculating module is configured to calculate a tilt angle of said reference optical axis with respect to the horizontal and a tilt angle of said monopod with respect to the vertical based on a detection result of said attitude detector, and at least either one of said arithmetic control module and said calculating module is configured to measure a horizontal distance and a vertical distance of the object to be measured with reference to the reference point based on the tilt angle of said reference optical axis to the horizontal, the tilt angle of said monopod to the vertical and a distance measurement result of said distance measuring unit, wherein the surveying instrument further comprises a lower image pickup module provided at a known position with respect to said surveying instrument main body, wherein said lower image pickup module has a lower image pickup optical axis directed downward and acquires a second image including the lower end of said monopod and its periphery, at least either one of said arithmetic control module and said calculating module is configured to obtain a displacement between said second images due to a rotation around the axis of said monopod, or a tilting around the lower end or a spiral rotation around the lower end, and to calculate a rotation angle of said monopod around said reference point based on said displacement, and at least either one of said arithmetic control module and said calculating module is configured to determine a three-dimensional coordinate of said object to be measured with reference to said reference point based on the rotation angle of said monopod, the tilt angle of said reference optical axis with respect to the horizontal, the tilt angle of said monopod with respect to the vertical, and a distance measurement result of said distance measuring unit.

2. The surveying instrument according to claim 1, wherein said distance measuring unit has a distance measuring light source, an optical axis deflector provided on said reference optical axis, a distance measuring optical axis which coincides with said reference optical axis in a state not deflected by said optical axis deflector, and a projecting direction detecting module, wherein said optical axis deflector has a pair of optical prisms, said pair of optical prisms is capable of deflecting said distance measuring optical axis two-dimensionally by respective rotation control, said projecting direction detecting module is configured to detect a deflecting direction of said distance measuring optical axis based on the respective rotation positions of said optical prisms, said arithmetic control module is configured to control said optical axis deflector so as to scan said distance measuring light two-dimensionally, to obtain the distance measurement result measured along a scanning locus and data of a three-dimensional coordinate based on the rotation angle of said monopod, the tilt angle of said reference optical axis to the horizontal, and tilt angle of said monopod to the vertical and a deflecting direction of said distance measuring optical axis, and wherein at least either one of said arithmetic control module and said calculating module is configured to associate said three-dimensional coordinate along the scanning locus with the first image and to acquire an image with the three-dimensional coordinate with reference to the reference point.

3. The surveying instrument according to claim 1, wherein the first image and the second image are acquired such that an overlap portion is formed, and at least either one of said arithmetic control module and said calculating module is configured to synthesize the first image and the second image and to create an observation image including an area from the reference point to the object to be measured.

4. The surveying instrument according to claim 1, wherein said monopod is capable of extension/contraction for each known length, said surveying instrument main body is mounted on an extension/contraction portion of said monopod, and said lower image pickup module is provided on a fixed portion of said monopod.

5. The surveying instrument according to claim 1, wherein an auxiliary leg which regulates an inclination of said monopod is provided on said monopod.

6. The surveying instrument according to claim 3, wherein an auxiliary leg which regulates an inclination of said monopod is provided on said monopod.

\* \* \* \* \*